United States Patent
Jozwiak

(10) Patent No.: US 9,296,361 B1
(45) Date of Patent: Mar. 29, 2016

(54) WINDOW AND DEVICE WIPING SYSTEM

(71) Applicant: GM GLOBAL TECHNOLOGY OPERATIONS LLC, Detroit, MI (US)

(72) Inventor: Thomas W. Jozwiak, Southgate, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/597,279

(22) Filed: Jan. 15, 2015

(51) Int. Cl.
*B60S 1/38* (2006.01)

(52) U.S. Cl.
CPC ............ *B60S 1/38* (2013.01); *B60S 2001/3836* (2013.01)

(58) Field of Classification Search
CPC .......................... B60S 1/38; B60S 2001/3836
USPC ..................................................... 296/96.15
See application file for complete search history.

(56) References Cited

U.S. PATENT DOCUMENTS

| | | | | |
|---|---|---|---|---|
| 6,020,704 A * | 2/2000 | Buschur | ............... | B60S 1/0822 15/250.12 |
| 6,144,022 A * | 11/2000 | Tenenbaum | .......... | B60S 1/0822 15/DIG. 15 |
| 6,404,490 B2 * | 6/2002 | Blasing | ................ | B60S 1/0822 250/227.25 |
| 7,697,028 B1 * | 4/2010 | Johnson | .................... | B60R 1/00 348/113 |
| 2014/0270391 A1 * | 9/2014 | Addington | ........... | G01B 11/303 382/108 |

* cited by examiner

*Primary Examiner* — Pinel Romain
(74) *Attorney, Agent, or Firm* — Quinn Law Group, PLLC

(57) ABSTRACT

A wiping system is provided for a vehicle including a window having a window surface and a device having a device surface. The wiping system includes a moveable blade element for wiping both the window surface and the device surface. The moveable blade element includes a first portion and a second portion. The first portion has a first profile defining a first wiping edge configured to wipe the window surface. The second portion has a second profile defining a second wiping edge configured to wipe the device surface. The device surface may protrude from the window surface, and the second wiping edge may conform to the protrusion of the device surface from the window surface.

20 Claims, 1 Drawing Sheet

A vehicle typically includes front and rear windows to allow the driver and passengers to see out of the vehicle. The vehicle may also include front and rear wiping systems to remove rain, snow, ice, condensation, dirt and/or debris from the outer surface of the front and rear windows. The vehicle may also include a camera, sensor, emitter, or other device that protrudes from the outer surface of the front and/or rear window. It may be beneficial to remove rain, snow, ice, condensation, dirt, and/or debris from the outer surface of the camera, sensor, emitter, or other device with the same wiping system used to remove rain, snow, ice, condensation, dirt, and/or debris from the outer surface of the window.

WINDOW AND DEVICE WIPING SYSTEM

TECHNICAL FIELD

This disclosure relates to a window and device wiping system for a vehicle.

BACKGROUND

SUMMARY

A wiping system is provided for a vehicle including a window having a window surface and a device having a device surface. The wiping system includes a moveable blade element for wiping both the window surface and the device surface. The moveable blade element includes a first portion and a second portion. The first portion has a first profile defining a first wiping edge configured to wipe the window surface. The second portion has a second profile defining a second wiping edge configured to wipe the device surface. The device surface may protrude from the window surface, and the second wiping edge may conform to the protrusion of the device surface from the window surface.

A wiper blade is also provided. The wiper blade is for use with a vehicle having a window surface and a device surface protruding beyond the window surface. The wiper blade includes a device surface wiping portion having a device surface wiping profile configured such that only the device surface is wiped by the device surface wiping profile. The wiper blade may also include a window surface wiping portion having a window surface wiping profile configured such that only the window surface is wiped by the window surface wiping profile.

A vehicle is also provided. The vehicle includes a window having a window surface, a device having a device surface protruding beyond the window surface; and a wiping system. The wiping system has a moveable blade element for wiping both the window surface and the device surface. The moveable blade element includes a first portion and a second portion. The first portion has a first wiping profile configured to wipe the window surface. The second portion has a second wiping profile configured to wipe the device surface.

The wiping system, the wiper blade, and the vehicle enable removal of rain, snow, ice, condensation, dirt, and/or debris from the outer surface of the camera, sensor, emitter, or other device with the same wiping system used for removal of rain, snow, ice, condensation, dirt, and/or debris from the outer surface of the window.

The above features and advantages and other features and advantages of the present teachings are readily apparent from the following detailed description of the best modes for carrying out the present teachings when taken in connection with the accompanying drawings.

DETAILED DESCRIPTION

Figure 1:
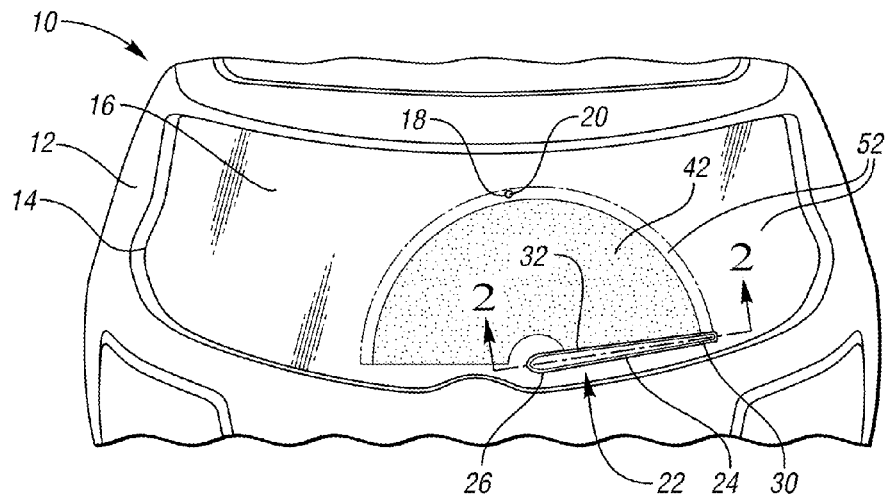
FIG. 1 is a fragmentary schematic perspective illustration of a vehicle having a window and device wiping system.

Referring to the drawings, wherein like reference numbers refer to like components throughout the views, FIG. 1 shows a vehicle 10 including a body 12 and a window 14 attached to the body 12. The window 14 has a window surface 16 on the exterior of the vehicle 10. The vehicle 10 also includes a device 18 having a device surface 20. The device 18 and the device surface 20 may protrude beyond the window surface 16 on the exterior of the vehicle 10. The window 14 may be a front, rear, or side window relative to the direction of travel of the vehicle 10. The window 14 may be made of a glass, a plastic, a glass and plastic composite, or of any other material suitable for a vehicle window 14. The device 18 may be a camera or may be any other sensor or emitter suitable for sensing the exterior environment of the vehicle 10 or for emitting signals to the exterior environment of the vehicle 10.

The window surface 16 and the device surface 20 may face rearward of the vehicle 10. Alternatively, the window surface 16 and the device surface 20 may face forward of the vehicle 10. Facing forward of the vehicle 10 is defined as facing substantially in the direction in which the vehicle 10 travels when the vehicle 10 is moving in a forward direction. Facing rearward of the vehicle 10 is defined as facing substantially in the direction in which the vehicle 10 travels when the vehicle 10 is moving in a reverse direction. Facing rearward of the vehicle 10 is facing in the direction substantially opposite from facing forward of the vehicle 10. As a non-limiting example, the device 18 may be a camera including a lens having a lens surface, and the device surface 20 may be the lens surface.

Figure 2:
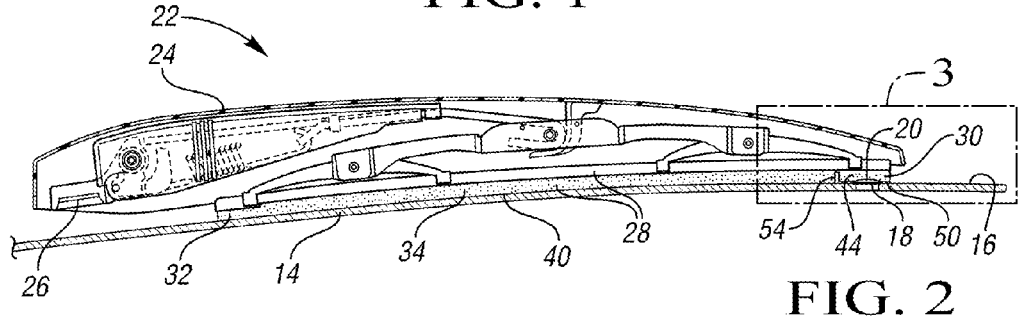
FIG. 2 is a fragmentary schematic cross-sectional illustration partially in elevation of the window and device wiping system of FIG. 1 taken at line 2-2 of FIG. 1 to show a wiper arm and wiper blade from heal to tip.

The vehicle 10 also includes a wiping system 22. The wiping system 22 has a wiper blade or moveable blade element 28 for wiping both the window surface 16 and the device surface 20. The wiper blade may be made of a rubber, a plastic, a rubber and metal composite, or of any other material or materials suitable for wiping both the window surface 16 and the device surface 20. Wiping is defined as cleaning and/or drying a surface by rubbing. The wiping system 22 may remove rain, snow, ice, condensation, dirt, debris, and/or other contamination by wiping both the window surface 16 and the device surface 20. The wiper blade or moveable blade element 28 may be connected to a wiper arm 24 which may be connected to a wiper arm pivot (not shown) at a wiper arm pivot connection feature 26, as best seen in FIG. 2. The wiper arm pivot may be rotated by a motor (not shown) connected to the vehicle 10 to actuate the wiping system 22 and move the wiper arm 24 and the wiper blade or blade element 28 over both the window surface 16 and the device surface 20. Other methods and mechanisms for actuating the wiping system 22 and moving the blade element 28 over both the window surface 16 and the device surface 20 may be used.

The window surface 16 has a wiped portion 42 that is wiped by the wiper blade or moveable blade element 28 and an unwiped portion 52 that is not wiped by the wiper blade or moveable blade element 28. A portion of the unwiped portion 52 may be under the wiper arm 24 and under the wiper blade or moveable blade element 28, as shown if FIG. 1.

Figure 3:
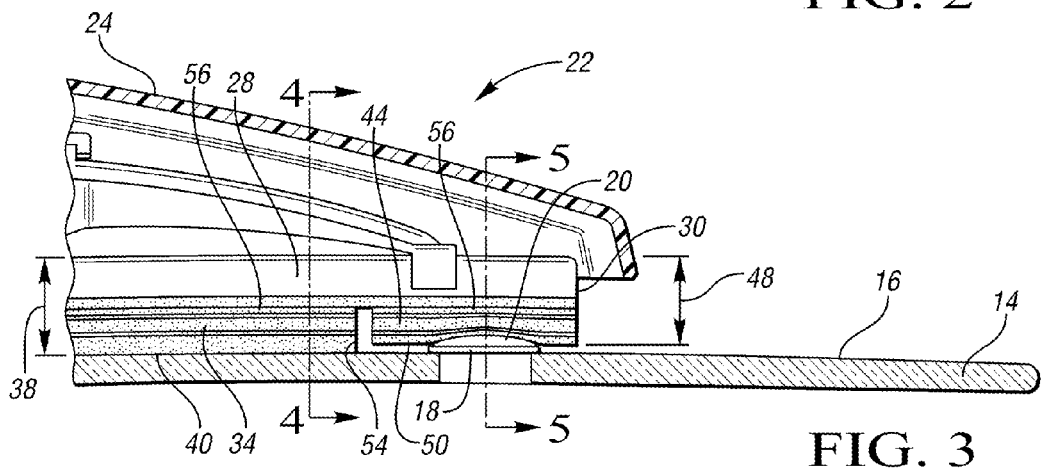
FIG. 3 is an enlarged fragmentary schematic cross-sectional illustration of the tip portion of the window and device wiping system of FIG. 1 at area 3 of FIG. 2.
Figure 4:
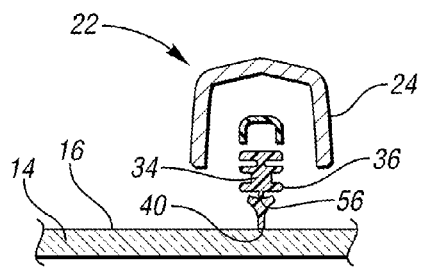
FIG. 4 is a schematic cross-sectional illustration of the window and device wiping system of FIG. 1 taken at line 4-4 of FIG. 3 to show the wiper blade with a nominal depth wiping edge on the window surface.
Figure 5:
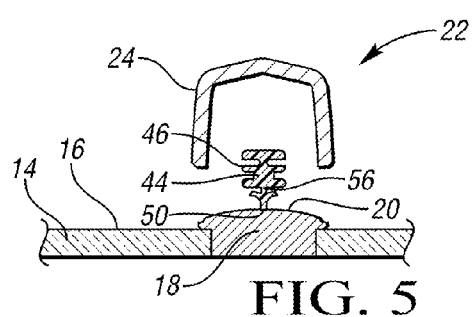
FIG. 5 is a schematic cross-sectional illustration of the window and device wiping system of FIG. 1 taken at line 5-5 of FIG. 3 to show the wiper blade with a reduced or shorter depth wiping edge on the device surface.

Referring now to FIGS. 2 and 3, the moveable blade element 28 includes a first portion or window surface wiping portion 34 and a second portion or device surface wiping portion 44. The first portion 34 has a first profile 36, as best shown in FIG. 4, defining a first wiping edge 40 configured to wipe the wiped portion 42 of the window surface 16 when the moveable blade element 28 is moved over the window surface 16. The second portion 44 has a second profile 46, as best seen in FIG. 5, defining a second wiping edge 50 configured to wipe the device surface 20 when the moveable blade element 28 is moved over the device surface 20. The second portion 44 may be configured to wipe only the device surface 20 and to not wipe the window surface 16. The second wiping edge 50 may conform to the protrusion of the device surface 20 from the window surface 16. A profile, as used herein, is defined as the outline of the moveable blade element or wiper blade 28 as seen when viewing a cross section of the moveable blade element or wiper blade 28 taken perpendicular to its length, as best seen in FIGS. 4 and 5.

Referring again to FIG. 2, the moveable blade element 28 may have a tip portion 30 and a heel portion 32. The tip potion 30 of the moveable blade element 28 is defined as the portion of the moveable blade element 28 that is farthest from the wiper arm pivot connection feature 26. The heel portion 32 of the moveable blade element 28 is defined as the portion of the moveable blade element 28 that is closest to the wiper arm pivot connection feature 26. The tip portion 30 and the heel portion 32 of the moveable blade element 28 are at opposite ends of the moveable blade element 28. The second portion 44 of the moveable blade element 28 may be located at the tip portion 30 of the moveable blade element 28. Alternatively, the second portion 44 of the moveable blade element 28 may be located at the heel portion 32 of the moveable blade element 28.

If the wiping system 22 does not include a wiper arm pivot and a wiper arm pivot connection feature 26, the tip portion 30 of the moveable blade element 28 is defined as the portion of the moveable blade element 28 that wipes the largest area of the window surface 16. If the wiping system 22 does not include a wiper arm pivot and a wiper arm pivot connection feature 26, the heel portion 32 of the moveable blade element 28 is defined as the portion of the moveable blade element 28 that wipes the smallest area of the window surface 16.

Referring now to FIGS. 3, 4, and 5, the device 18 and the device surface 20 may protrude from the window surface 16. The second profile 46 may conform to the protrusion of the device surface 20 from the window surface 16. The first profile 36 may have a first depth or first distance 38 and the second profile 46 may have a second depth or second distance 48. The second depth 48 may be shorter than the first depth 38. The only difference between the first profile 36 and the second profile 46 may be that the second depth 48 is shorter than the first depth 38. The second depth 48 may be made shorter than the first depth 38 by methods including, but not limited to, trimming, cutting, extruding, and molding.

The moveable blade element 28 may form a notch 54 located between the first portion 34 and the second portion 44 of the moveable blade element 28. The moveable blade element 28 may further include a hinge 56 for both wiping portions 34, 44. The notch 54 may extend from the hinge 56 to one of the first wiping edge 40 and the second wiping edge 50. The notch 54 may be formed by cutting, molding, or any other suitable process. The first wiping edge 40 may be shaped to conform to the shape of the wiped portion 42 of the window surface 16 or may be any other shape suitable for wiping the window surface 16 to remove rain, snow, ice, condensation, dirt, debris, and/or other contamination from the window surface 16. The second wiping edge 50 may be a straight edge, as shown, may be shaped to conform to the device surface 20, or may be any other shape suitable for wiping the device surface 20 to remove rain, snow, ice, condensation, dirt, debris, and/or other contamination from the device surface 20.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A wiping system for a vehicle including a window having a window surface and a device having a device surface, the wiping system comprising:
   a moveable blade element for wiping both the window surface and the device surface, the moveable blade element including:
      a first portion having a first profile defining a first wiping edge configured to wipe the window surface; and
      a second portion having a second profile defining a second wiping edge configured to wipe the device surface.

2. The wiping system of claim 1, wherein the device surface protrudes from the window surface and the second wiping edge conforms to the protrusion of the device surface from the window surface.

3. The wiping system of claim 2, wherein the first profile has a first depth and the second profile has a second depth; and wherein the second depth is shorter than the first depth.

4. The wiping system of claim 3, wherein the only difference between the first and second profiles is that the second depth is shorter than the first depth.

5. The wiping system of claim 1, wherein the moveable blade element forms a notch located between the first portion and the second portion.

6. The wiping system of claim 5, wherein the moveable blade element further includes a hinge; and
   wherein the notch extends from the hinge to one of the first wiping edge and the second wiping edge.

7. The wiping system of claim 1, wherein the moveable blade element has a tip portion and a heel portion; and
   wherein the second portion of the moveable blade element is located at the tip portion of the moveable blade element.

8. The wiping system of claim 1, wherein the moveable blade element has a tip portion and a heel portion; and
   wherein the second portion of the moveable blade element is located at the heel portion of the moveable blade element.

9. The wiping system of claim 1, wherein the window surface and the device surface face rearward of the vehicle.

10. The wiping system of claim 1, wherein the device is a camera including a lens having a lens surface; and
    wherein the device surface is the lens surface.

11. A wiper blade for use with a vehicle having a window surface and a device surface protruding beyond the window surface, the wiper blade comprising:
a device surface wiping portion having a device surface wiping profile configured such that only the device surface is wiped by the device surface wiping profile.

12. The wiper blade of claim 11, further comprising a window surface wiping portion having a window surface wiping profile configured such that only the window surface is wiped by the window surface wiping profile; and
wherein the wiper blade forms a notch located between the device surface wiping portion and the window surface wiping portion.

13. The wiper blade of claim 12, wherein the wiper blade further comprises a hinge for both of the wiping portions, a window surface wiping edge of the window surface wiping profile, and a device surface wiping edge of the device surface wiping profile; and
wherein the notch extends from the hinge to one of the wiping edges.

14. The wiper blade of claim 11, wherein the wiper blade has a tip portion and a heel portion; and
wherein the device surface wiping portion of the wiper blade is located at the tip portion of the wiper blade.

15. The wiper blade of claim 11, wherein the wiper blade has a tip portion and a heel portion; and
wherein the device surface wiping portion of the wiper blade is located at the heel portion of the wiper blade.

16. A vehicle, comprising:
a window having a window surface;
a device having a device surface protruding beyond the window surface;
a wiping system having a moveable blade element for wiping both the window surface and the device surface, the moveable blade element including:
a first portion having a first wiping profile configured to wipe the window surface; and
a second portion having a second wiping profile configured to wipe the device surface.

17. The vehicle of claim 16, wherein the first wiping profile extends a first distance toward the window surface and the second wiping profile extends a second distance toward the window surface: and
wherein the second distance is less than the first distance.

18. The vehicle of claim 17, wherein the only difference between the first and second wiping profiles is that the second distance is less than the first distance.

19. The vehicle of claim 16, wherein the first and second portions of the moveable blade element further include respectively a hinge, a first wiping edge of the first wiping profile, and a second wiping edge of the second wiping profile;
wherein the moveable blade element forms a notch located between the first portion and the second portion; and
wherein the notch extends from the hinge to one of the first wiping edge and the second wiping edge.

20. The vehicle of claim 16, wherein the window surface and the device surface face rearward of the vehicle.

* * * * *